(12) United States Patent
Schmitz

(10) Patent No.: US 8,979,202 B2
(45) Date of Patent: Mar. 17, 2015

(54) CRASH-ACTIVE HEADREST HAVING A LOCKING PUSHBUTTON

(75) Inventor: Andreas Schmitz, Burscheid (DE)

(73) Assignee: Johnson Controls GmbH (DE)

( * ) Notice: Subject to any disclaimer, the term of this patent is extended or adjusted under 35 U.S.C. 154(b) by 687 days.

(21) Appl. No.: 13/129,731

(22) PCT Filed: Oct. 6, 2009

(86) PCT No.: PCT/EP2009/007155
§ 371 (c)(1),
(2), (4) Date: Jun. 22, 2011

(87) PCT Pub. No.: WO2010/054723
PCT Pub. Date: May 20, 2010

(65) Prior Publication Data
US 2011/0241393 A1    Oct. 6, 2011

(30) Foreign Application Priority Data

Nov. 17, 2008    (DE) .......................... 10 2008 057 792

(51) Int. Cl.
*B60N 2/427* (2006.01)
*B60N 2/42* (2006.01)
*B60R 21/00* (2006.01)
*B60N 2/48* (2006.01)

(52) U.S. Cl.
CPC ............ *B60N 2/4885* (2013.01); *B60N 2/4864* (2013.01)
USPC ...................... 297/408; 297/409; 297/216.12

(58) Field of Classification Search
CPC ... B60N 2/4885; B60N 2/4864; B60N 2/4814
USPC ...................................... 297/216.12, 408, 409
See application file for complete search history.

(56) References Cited

U.S. PATENT DOCUMENTS

| 4,657,304 | A  | * | 4/1987  | Heesch et al.     | 297/391    |
|-----------|----|---|---------|-------------------|------------|
| 4,762,367 | A  | * | 8/1988  | Denton            | 297/409    |
| 4,856,848 | A  | * | 8/1989  | O'Sullivan et al. | 297/391    |
| 5,020,855 | A  | * | 6/1991  | Lindberg et al.   | 297/391    |
| 6,478,373 | B1 | * | 11/2002 | Hake et al.       | 297/216.13 |
| 6,511,130 | B2 | * | 1/2003  | Dinkel et al.     | 297/410    |
| 6,666,516 | B2 | * | 12/2003 | Grammss et al.    | 297/407    |
| 6,802,562 | B1 | * | 10/2004 | Hake et al.       | 297/216.12 |

(Continued)

FOREIGN PATENT DOCUMENTS

| DE | 103 25 472        | 6/2003  |
|----|-------------------|---------|
| DE | 103 55 773        | 11/2003 |
| DE | 102007002615 B3   | 2/2008  |

(Continued)

OTHER PUBLICATIONS

English Translation of the Written Opinion of the International Search Authority—International Appln. No. PCT/EP2009/007155.

*Primary Examiner* — David R Dunn
*Assistant Examiner* — Tania Abraham
(74) *Attorney, Agent, or Firm* — The Dobrusin Law Firm, P.C.

(57) ABSTRACT

The present invention relates to a crash-active headrest of a motor vehicle seat having a head part at least partially displaceable in the direction of the head of a seat occupant for comfort and/or safety purposes, and that can be locked in said position by means of a form-fit and/or frictional connection means, said headrest comprising means for transitioning the form-fit and/or frictional connection means from a locked into an unlocked position, characterized thereby.

18 Claims, 3 Drawing Sheets

(56) References Cited

U.S. PATENT DOCUMENTS

Figure 2A:
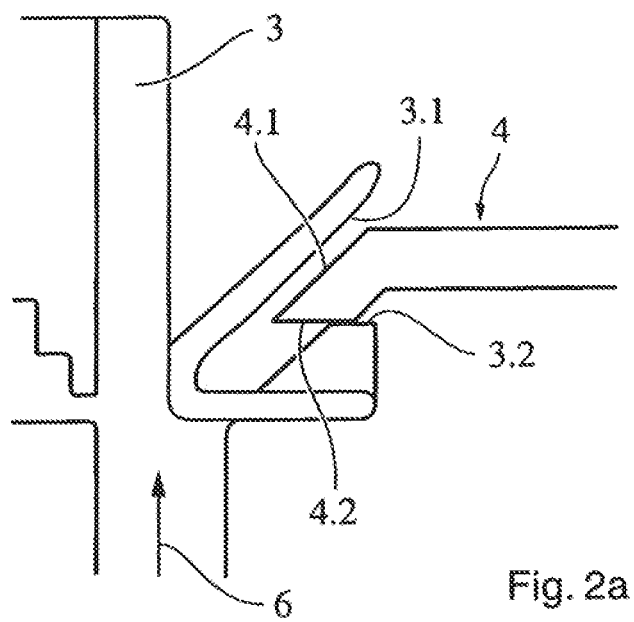

| | | | |
|---|---|---|---|
| 6,890,028 B2 * | 5/2005 | Pal et al. | 297/216.12 |
| 7,134,717 B2 * | 11/2006 | Thunnissen et al. | 297/216.12 |
| 7,517,015 B2 * | 4/2009 | Terada et al. | 297/216.12 |
| 7,887,094 B2 * | 2/2011 | Sakaida | 280/803 |
| 2005/0077762 A1 * | 4/2005 | Kraemer et al. | 297/216.12 |
| 2008/0252113 A1 * | 10/2008 | Alexander et al. | 297/216.12 |
| 2008/0272631 A1 * | 11/2008 | Hartlaub | 297/216.12 |

FOREIGN PATENT DOCUMENTS

| | | | |
|---|---|---|---|
| EP | 1369310 A1 * | 12/2003 | B60R 21/01 |
| WO | 2004/056606 | 7/2004 | |
| WO | 2005/097545 | 10/2005 | |
| WO | WO 2007076948 A2 * | 7/2007 | |

* cited by examiner

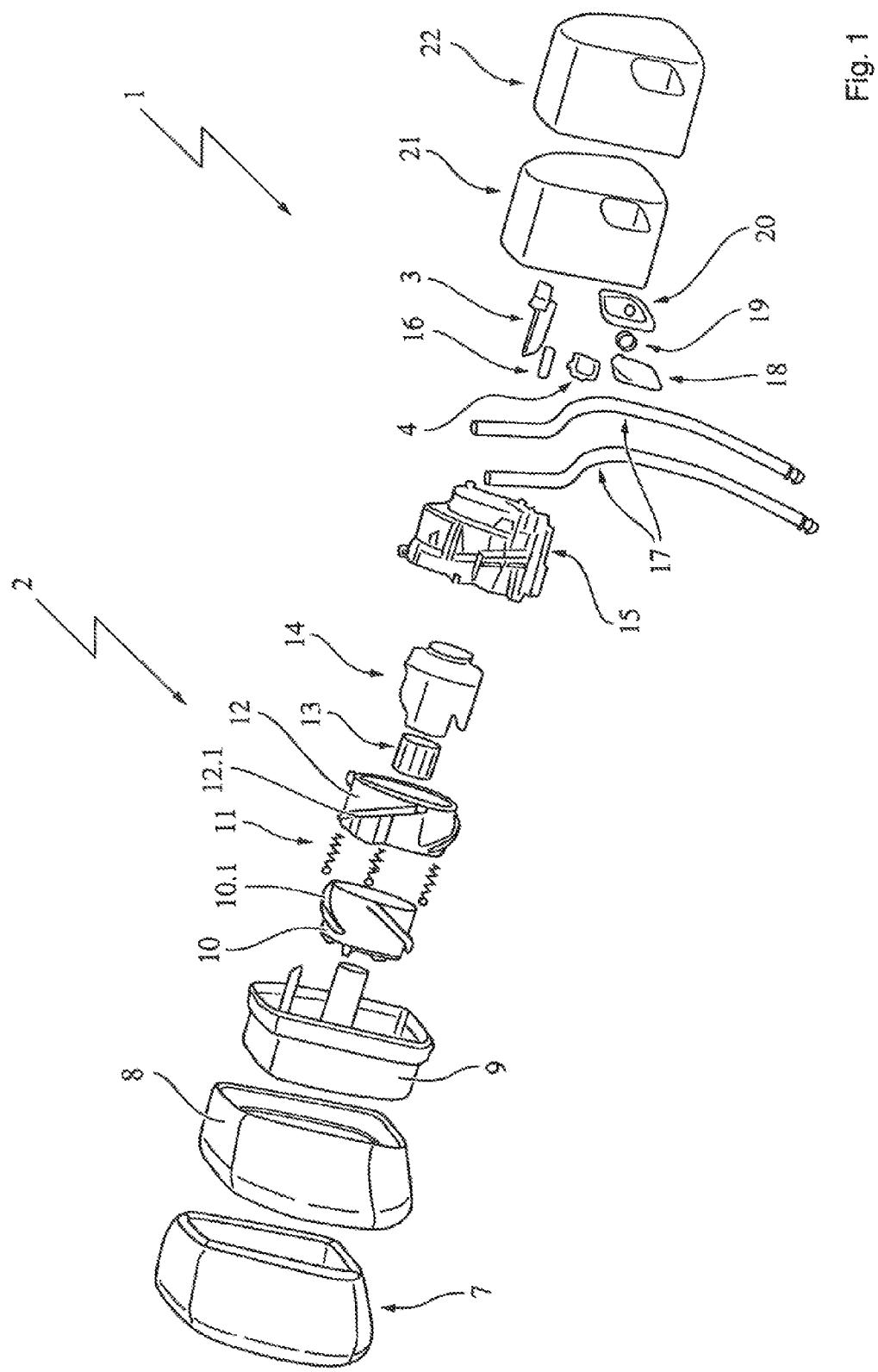

CRASH-ACTIVE HEADREST HAVING A LOCKING PUSHBUTTON

CLAIM OF BENEFIT OF FILING DATE

The present application claims the benefit priority from DE 10 2008 057 792.8 filed 17 Nov. 2008, all of which are hereby incorporated by reference in their entirety. This application is a national phase application of PCT/EP2009/007155, filed 06 Oct. 2009 (published as WO2010/054723).

The present invention relates to a crash-active headrest of a motor vehicle seat having a head part which is at least partially displaceable in the direction of the head of a seat occupant for comfort and/or safety purposes and may be locked in said position by a positive and/or non-positive connection means, said headrest comprising a means which transfers the positive and/or non-positive connection means from a locked position into an unlocked position.

Crash-active headrests are known from the prior art, for example, from DE 103 254 472, WO 2004/056 606, WO 2005/097 545 and DE 103 55 773. Said headrests are provided to be displaceable for comfort and/or safety purposes from a position relatively far removed from the head of the vehicle occupant in the direction of the head of the seat occupant, and able to be locked there. In particular in comfort positions, however, it has arisen in the past that the headrest has moved of its own accord in the direction of the head of the seat occupant.

It was, therefore, the object of the present invention to provide a crash-active headrest which does not have the drawbacks of the prior art.

The object is achieved by a crash-active headrest of a motor vehicle seat having a head part which is at least partially displaceable in the direction of the head of a seat occupant for comfort and/or safety purposes and may be locked in said position by a positive and/or non-positive connection means, said headrest comprising a means which transfers the positive and/or non-positive connection means from a locked position into an unlocked position and the means prevents inadvertent unlocking of the positive and/or non-positive connection means.

The present invention relates to a crash-active headrest, in particular a crash-active headrest as is disclosed, for example, in WO 2005/097 545, which is incorporated herein as a reference and thus forms part of the disclosure. The crash-active headrests are part of a vehicle seat or a vehicle seat bench, and have a head part which is displaceable at least partially in the direction of the head of the occupant for comfort and/or safety purposes. The comfort adjustment makes it possible for the headrest to provide support for the head of the seat occupant, for example, during travel. The safety adjustment of the headrest takes place in the event of a rear impact to avoid injury to the head, the throat, the neck and/or the back of the vehicle occupant. Thus in the event of a rear impact, the headrest moves abruptly in the direction of the head of the occupant. As regards both the comfort adjustment and the safety adjustment, the adjusted part of the headrest may be locked in the extended position in order to provide the vehicle occupant with firm support for the head and, in the event of a rear impact, to prevent the headrest from yielding in the case of an impact to the head. Thus the headrest according to the invention has a positive and/or non-positive connection means, which locks the movable part of the headrest or the headrest itself in the respectively desired position. In order to be able to alter the comfort position and/or to be able to move the headrest again into its original position after an accident, said positive and/or non-positive connection means has to be provided to be releasable. Thus, the headrest according to the invention has a means which unlocks the positive and/or non-positive connection means. This means is, therefore, provided according to the invention so that it is not only able to lock the positive and/or non-positive connection means, but is also able to fix said positive and/or non-positive connection means in its locked position, so that unintentional securing of the headrest or parts of the headrest is reliably avoided. As a result, it is a combined unlocking/locking means.

Preferably, the positive and/or non-positive connection means and/or the unlocking/locking means are pretensioned in the locked position.

Preferably, the unlocking/locking means is a push element, preferably a push button.

Preferably, the operational direction of the unlocking/locking means is arranged perpendicular to the unlocking direction of the positive and/or non-positive connection means.

Preferably, the unlocking/locking means has a first bearing surface which cooperates in an unlocking manner with the positive and/or non-positive connection means.

Particularly preferably, this bearing surface cooperates with a first drive surface of the positive and/or non-positive connection means.

Further preferably, the unlocking/locking means comprises a second bearing surface which locks the positive and/or non-positive connection means in its locked position. Particularly preferably, this bearing surface cooperates with a first locking surface of the positive and/or non-positive connection means.

In a further preferred embodiment, the bearing surfaces of the unlocking/locking means are implemented in the form of a slotted guide in the positive and/or non-positive connection means. In this preferred embodiment, therefore, the unlocking/locking means preferably comprises a projection which is guided in the slotted guide.

Preferably, the mode of operation of the unlocking/locking means changes as a result of altering the position thereof. In one position it acts in a locking manner, and in a second position it acts in an unlocking manner.

The invention is explained hereinafter with reference to FIGS. 1 to 3. These explanations are merely given by way of example and do not limit the general inventive idea.

FIG. 1 shows an embodiment of the crash-active headrest.

FIGS. 2a and b show a first embodiment of the positive and/or non-positive connection means and of the unlocking/locking means.

FIGS. 3a, 3b, 3c and 3d show a further embodiment of the positive and/or non-positive connection means and of the unlocking/locking means.

FIG. 1 shows an embodiment of the crash-active headrest as is substantially disclosed in WO 2005/097 545, so that the description provided there is intended to serve as a supplement and this publication is incorporated as a reference in the present application and thus forms part of the disclosure. The crash-active headrest 1 is arranged by means of support brackets 17 on the seat part of a vehicle seat or a vehicle seat bench (neither shown). It comprises on its side facing the seat occupant a plate 9 which is covered by a padded portion 8 and a cover 7. A first rotary part 10 which comprises the flanks 10.1 is rotatably mounted on this plate 9. This rotary part cooperates with a second part 12 which is fixedly mounted in the housing 15. The second part 12 also has flanks 12.1 which cooperate with the flanks 10.1 of the first rotary part. Between the two parts 10, 12 are located springs 11 which in each case are supported on the rotary part 10 and on the part 12 and which are compressed. By a rotation of the rotary part 10 relative to the fixed part 12 in which the flanks 10.1 move along the flanks 12.1, the rotary part 10 performs a translatory movement, which moves the plate 9 towards the head of the seat occupant or away from the head of the vehicle occupant. This movement is assisted and/or arrested by the springs 11, which are relaxed with a movement toward the head of the seat occupant and tensioned with a movement away from the head of the occupant. Both a comfort adjustment of the plate 9 and a safety adjustment may take place by means of these specific movements. Between the bearing 9 and the rotary part 10, a ball bearing 13 is arranged. The rotation of the first rotary part 10 is caused by a similarly pretensioned rotary disk 10, the left-hand part thereof cooperating with the rotary part 10, and which is supported with its right-hand part on the housing 15. The respective rotational position of this rotary part 14 is ensured by the positive and/or non-positive connection means 3, in this case a lever, by this lever 3 engaging positively and/or non-positively between teeth (not shown) and in its locked position preventing the rotary disk from rotating further, at least in one rotational direction. Normally, only the rotational direction which moves the plate 9 further in the direction of the vehicle occupant is secured, as in the reverse rotational direction an adjustment is made difficult by the springs 11 and/or the torsion spring present in the rotary disk 14. Said lever 3 is pretensioned by means of a spring 16 in its locked position. The lever 3 may be unlocked by means of an unlocking means 4, i.e. moved outside the teeth arranged on the rotary disk 14. This is carried out by a push button 18 which is arranged in a housing 20. The push button 20 is pretensioned counter to the pushing direction. At its rear end, the headrest according to the invention has a rear cover panel 21 and a cover 22.

Figure 2B:
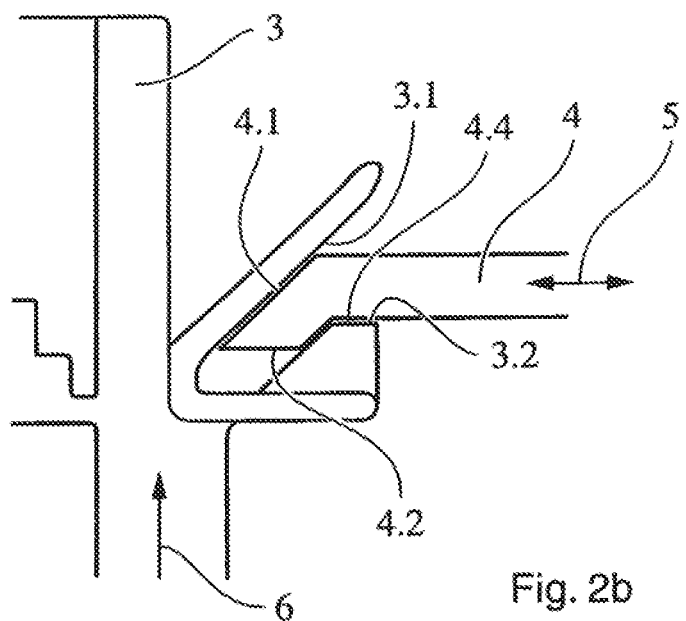

FIGS. 2*a* and 2*b* now show a first embodiment of the lever 3 and/or of the unlocking/locking means 4. The unlocking direction of the lever 3 is shown by the arrow 6. A drive surface 3.1 located obliquely relative to the unlocking direction 6 is arranged, in this case integrally formed, on the lever 3. A locking surface 3.2 is also arranged/integrally formed on the lever 3. The unlocking/locking means denoted hereinafter as the push button has a first bearing surface 4.1 corresponding to the drive means 3.1 and a second bearing surface 4.2 corresponding to the locking surface 3.2. FIG. 2*a* shows the push button in its locked position, which prevents the lever 3 from automatically adopting its unlocked position. In this case, the locking surface 3.2 of the lever 3 cooperates with the second bearing surface 4.2, so that the lever 3 is not able to move in the direction symbolized by the arrow 6.

In FIG. 2*b*, the push button 4 has been moved into its unlocked position, i.e. it has been pushed from right to left as symbolized by the arrow 5. The person skilled in the art understands that the lever 4 in this case maintains its horizontal orientation. As a result, the surfaces 3.1 and 4.1 are now in engagement with one another and the lever 3 is able to be transferred into the unlocked position. In this case, the surface 4.1 may act as a drive surface. The locking surface 3.2 of the lever 3 no longer prevents an unlocking movement 6 of the lever 3 in this position. It limits, however, the movement of the lever 3 by coming to bear against the bearing surface 4.4 after the unlocking has taken place. If the push button is released again, it moves from left to right and the lever 3 again adopts its locked position.

Figure 3A:
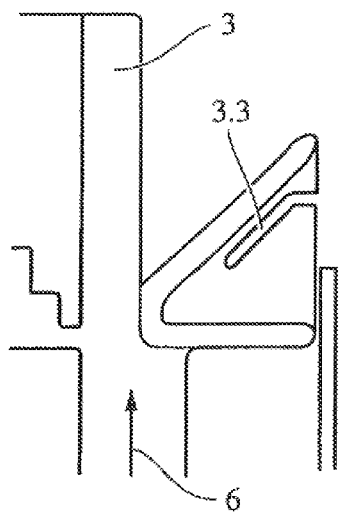
Figure 3B:
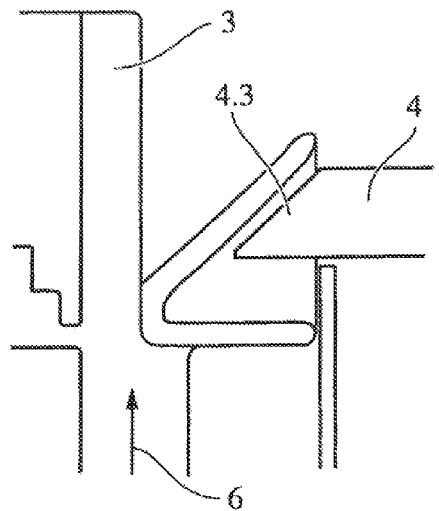
Figure 3C:
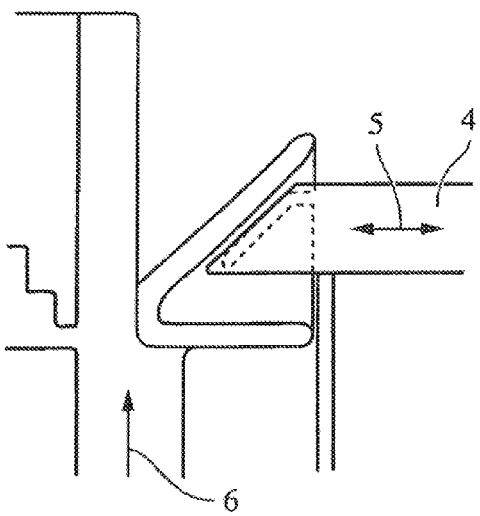
Figure 3D:
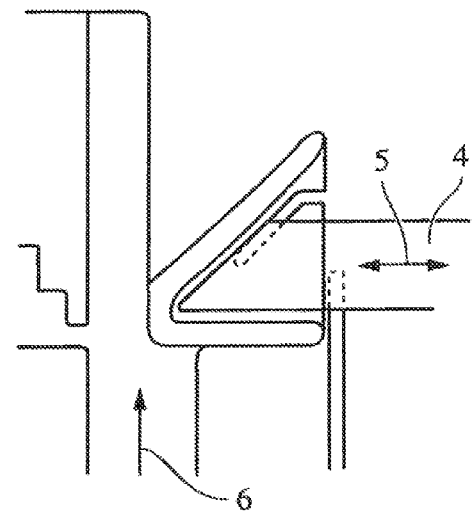

FIGS. 3*a*-3*d* show a further embodiment of the lever 3 and/or of the push button 4. In the present case, the lever 3 is provided with a slotted guide 3.3. As visible in FIG. 3*b*, the push button 4 in this exemplary embodiment has a projection, for example a pin 4.3, which engages in the slotted guide 3.3. By the engagement of the pin 4.3 in the slotted guide 3.3, the push button 4 prevents the lever 3.3 from being inadvertently unlocked (FIG. 3*b*). If the push button 4 is now moved as shown in FIGS. 3*c* and d from right to left, the lever is forced upward in the direction symbolized by the arrow 6. The person skilled in the art understands that the lever 4 in this case maintains its horizontal orientation. If the push button is again released, it moves from left to right and the lever 3 again adopts its locked position.

LIST OF REFERENCE NUMERALS

1 Crash-active headrest
2 Head part
3 Positive and/or non-positive connection means, lever
3.1 First bearing surface, drive surface
3.2 Second bearing surface, locking surface
3.3 Slotted guide
4 Means, unlocking means, locking means
4.1 First bearing surface
4.2 Second bearing surface
4.3 Projection
4.4 Bearing surface
5 Operational direction of means 4
6 Unlocking direction
7 Cover of headrest
8 Padded portion, foam
9 Plate
10 First rotary part
10.1 Flanks
11 Drive means, springs
12 Second part
12.1 Flanks
13 Ball bearing
14 Rotary disk
15 Housing
16 Spring of the lever 4
17 Support bracket
18 Push button
19 Spring of push button
20 Housing
21 Rear cover panel
22 Cover

The invention claimed is:

1. A crash-active headrest of a motor vehicle seat having a head part which is at least partially displaceable in the direction of the head of a seat occupant for comfort and/or safety purposes;
wherein the crash-active headrest comprises on its side facing the seat occupant:
a plate which is covered by a padded portion and a cover,
a first rotary part which is rotatably mounted on the plate and cooperates with a second rotary part,
at least one or more first flanks located on the first rotary part,
at least one or more second flanks located on the second rotary part which cooperated with the at least one or more first flanks of the first rotary part,
at least one or more springs located between the first rotary part and the second rotary part which are supported on the first rotary part and on the second rotary part and are compressed,
wherein the first rotary part can perform a translatory movement by rotating relative to the second rotary part which is fixed and the at least one or more first flanks move along the at least one or more second flanks, wherein the rotation of the first rotary part moves the plate towards the head of the seat occupant or away from the head of the seat occupant, and wherein the rotation of the first rotary part is caused by a pretensioned rotary disk;

wherein the head part may be locked in a position by a lever which can transfer from a locked position into an unlocked position and from the unlocked position to the locked position, wherein the crash-active headrest includes a push element which transfers the lever from the locked position into the unlocked position and from the unlocked position to the locked position;

wherein the lever has a slotted guide and the push element includes a projection which is guided in the slotted guide;

wherein the mode of operation of the push element changes as a result of altering the position, in one position acting in a locking manner, and in a second position acting in an unlocking manner;

wherein a rotational position of the rotary disk is ensured by the lever as the lever is configured to engage positively or non-positively between teeth arranged on the rotary disk to prevent the rotary disk from rotating further, at least in one rotation direction, wherein the lever is configured to be moved outside the teeth by means of the push element to be unlocked.

2. The crash-active headrest as claimed in claim 1, wherein the lever and/or the push element are pretensioned in the locked position.

3. The crash-active headrest as claimed in claim 2, wherein the push element is a push button.

4. The crash-active headrest as claimed in claim 2, wherein the operational direction of the push element is arranged perpendicular to an unlocking direction of the lever.

5. The crash-active headrest as claimed in claim 1, wherein the push element is a push button.

6. The crash-active headrest as claimed in claim 5, wherein the push button is pretensioned counter to a pushing direction of the push button.

7. The crash-active headrest as claimed in claim 1, wherein an operational direction of the push element is arranged perpendicular to an unlocking direction of the lever.

8. The crash-active headrest as claimed in claim 1, wherein the push element has a first bearing surface which cooperates in an unlocking manner with the lever.

9. The crash-active headrest as claimed in claim 8, wherein the first bearing surface cooperates with a first drive surface of the lever; and the first drive surface is art of the slotted guide of the lever.

10. The crash-active headrest as claimed in claim 9, wherein the first bearing surface is part of the slotted guide.

11. The crash-active headrest as claimed in claim 9, wherein the first drive surface is located obliquely relative to an unlocking direction of the lever.

12. The crash-active headrest as claimed in claim 8, wherein the push element comprises a second bearing surface which locks the lever in its locked position.

13. The crash-active headrest as claimed in claim 12, wherein the second bearing surface cooperates with a first locking surface of the lever.

14. The crash-active headrest as claimed in claim 13, wherein the first bearing surface cooperates with a first drive surface of the lever, the first drive surface being part of the slotted guide of the lever and the first locking surface being part of the slotted guide of the lever.

15. The crash-active headrest as claimed in claim 1, wherein the push element comprises a second bearing surface which locks the lever in its locked position.

16. The crash-active headrest as claimed in claim 15, wherein the second bearing surface cooperates with a first locking surface of the lever; and the first locking surface is part of the slotted guide of the lever.

17. The crash-active headrest as claimed in claim 16, wherein a first bearing surface and the second bearing surface are part of the slotted guide.

18. The crash-active headrest as claimed in claim 1, wherein the push element prevents the lever from being inadvertently unlocked when the projection is engaged into the slotted guide.

* * * * *